US008858739B2

(12) United States Patent
Branagan et al.

(10) Patent No.: US 8,858,739 B2
(45) Date of Patent: Oct. 14, 2014

(54) PROCESS FOR CONTINUOUS PRODUCTION OF DUCTILE MICROWIRES FROM GLASS FORMING SYSTEMS

(75) Inventors: Daniel James Branagan, Idaho Falls, ID (US); Alla V. Sergueeva, Idaho Falls, ID (US); Jikou Zhou, Pleasanton, CA (US); James N. Milloway, Idaho Falls, ID (US)

(73) Assignee: The NanoSteel Company, Inc., Providence, RI (US)

( * ) Notice: Subject to any disclaimer, the term of this patent is extended or adjusted under 35 U.S.C. 154(b) by 446 days.

(21) Appl. No.: 12/910,640

(22) Filed: Oct. 22, 2010

(65) Prior Publication Data
US 2011/0094700 A1 Apr. 28, 2011

Related U.S. Application Data

(60) Provisional application No. 61/254,044, filed on Oct. 22, 2009.

(51) Int. Cl.
| | |
|---|---|
| *C21D 1/56* | (2006.01) |
| *C21D 9/52* | (2006.01) |
| *B22D 11/00* | (2006.01) |
| *C22C 38/02* | (2006.01) |
| *C22C 38/10* | (2006.01) |
| *C22C 45/02* | (2006.01) |

(52) U.S. Cl.
CPC .......... *B22D 11/005* (2013.01); *C21D 2201/03* (2013.01); *C21D 9/52* (2013.01); *C21D 1/56* (2013.01); *C22C 38/02* (2013.01); *C22C 38/105* (2013.01); *C22C 45/02* (2013.01)

USPC .......... 148/541; 148/546; 148/561; 148/596; 164/462; 164/474

(58) Field of Classification Search
USPC .......... 148/541, 546, 561, 596; 164/462, 474
See application file for complete search history.

(56) References Cited

U.S. PATENT DOCUMENTS

| | | | |
|---|---|---|---|
| 1,793,529 A | 2/1931 | Taylor | |
| 4,863,526 A | 9/1989 | Miyagawa et al. | |
| 4,985,089 A * | 1/1991 | Yoshizawa et al. | ........... 148/303 |
| 5,240,066 A * | 8/1993 | Gorynin et al. | ............... 164/461 |

(Continued)

OTHER PUBLICATIONS

Schuh, et al., "Mechanical Behavior of Amorphous Alloys" Acta Materialia, 55(2007), 4067-4109.

(Continued)

*Primary Examiner* — George Wyszomierski
(74) *Attorney, Agent, or Firm* — Grossman, Tucker, Perreault & Pfleger, PLLC

(57) ABSTRACT

A method and system of forming a micro-wire including heating metal feedstock to a liquid state within a glass tube, wherein the metal feedstock includes an iron based glass forming alloy comprising one or more of nickel and cobalt present in the range of 7 atomic percent to 50 atomic percent and one or more of boron, carbon, silicon, phosphorous and nitrogen present in the range of 1 to 35 atomic percent. Negative pressure may be provided to the interior the glass tube and the glass tube containing the metal feedstock may be drawn down. The metal feedstock in the glass tube may be cooled at a rate sufficient to form a wire exhibiting crystalline microstructures present in the range of 2 to 90 percent by volume in a glass matrix.

27 Claims, 11 Drawing Sheets

(56) References Cited

U.S. PATENT DOCUMENTS

| | | | |
|---|---|---|---|
| 6,698,246 B1* | 3/2004 | Beall et al. | 65/390 |
| 2006/0130995 A1* | 6/2006 | Adar et al. | 164/461 |
| 2006/0266543 A1 | 11/2006 | Clare et al. | |
| 2010/0065163 A1 | 3/2010 | Branagan | |

OTHER PUBLICATIONS

Taylor, "A Method of Drawing Metallic Filaments and a Discussion of Their Properties and Uses," Phys. Rev., 23, (1924) pp. 655-660.

Larin et al.,"Preparation and properties of glass-coated microwires" J. Magn. Magn. Mat., 249(2002), 39-45.

Donald, et al., "The preparation, properties and applications of some glass-coated metal filaments prepared by the Taylor-wire process" J. Material Science, 33(1996), 1139-1149.

Chiriac, "Preparation and characterization of glass covered magnetic wires" Material Science and Engineering, A304-306(2001), 166-171.

International Search Report and Written Opinion dated Dec. 20, 2010 issued in related International Patent Application No. PCT/US10/53828.

Zhukov et al. "Microwires coated by glass: A new family of soft and hard magnetic materials." Journal of Materials Research [online], Oct. 2000 [Retrieved on Dec. 7, 2010], vol. 15, No. 10, pp. 2107-2113, Retrieved from the Internet: <URL: http://www.mrs.org/s_mrs/bin.asp?CID=1655&DID=48369&DOC=FILE.PDF>, Abstract only.

* cited by examiner

PROCESS FOR CONTINUOUS PRODUCTION OF DUCTILE MICROWIRES FROM GLASS FORMING SYSTEMS

CROSS REFERENCE TO RELATED APPLICATIONS

The present application claims the benefit of the filing date of U.S. Provisional Application No. 61/254,044 filed on Oct. 22, 2009, the teachings of which are incorporated herein by reference.

FIELD OF INVENTION

The present disclosure relates to a process and improvements thereof for making microwire, wherein the microwire includes a glass matrix structure containing nanoscale precipitates exhibiting combinations of tensile properties including relatively high strength (>2 GPa) and relatively significant tensile elongation (>1%).

BACKGROUND

The Taylor-Ulitovsky process has traditionally been used to produce wire for a variety of non-structural type applications including security/anti-theft tags, pulse power, transformers, magnetic shields, magnets, radar absorption, sensors, and under floor resistance heating. Glass-coated microwires may produced be produced from copper, silver, gold, iron, platinum, and various glass forming alloy compositions. While these applications may be diverse, they may share a common feature in that the mechanical property requirements of the wire for these applications may be relatively low and may mainly have sufficient resiliency to hold together in the application where the stress load will be low. While high strength has been demonstrated in some micro-wires, no significant ductility has been substantiated.

SUMMARY

An aspect of the present application relates to a method of forming a micro-wire. The method may include heating metal feedstock to a liquid state within a glass tube, wherein the metal feedstock includes an iron based glass forming alloy comprising one or more of nickel and cobalt present in the range of 7 atomic percent to 50 atomic percent and one or more of boron, carbon, silicon, phosphorous and nitrogen present in the range of 1 to 35 atomic percent. The method may also include providing negative pressure to the interior the glass tube, drawing down the glass tube containing the metal feedstock, and cooling the metal feedstock in the glass tube at a rate sufficient to form a wire exhibiting crystalline microstructures present in the range of 2 to 90 percent by volume in a glass matrix.

Another aspect of the present application relates to a system for forming micro-wire. The system may include a glass tube having a first end and a second end and a continuous wire feedstock, wherein the continuous wire feedstock comprises an iron based glass forming alloy comprising one or more of nickel and cobalt present in the range of 7 atomic percent to 50 atomic percent and one or more of boron, carbon, silicon, phosphorous and nitrogen present in the range of 1 to 35 atomic percent. The system may also include a heater for heating the glass tube at the first end and a pressure control system operatively coupled with the interior of the glass tube, wherein the pressure control system comprises an inert gas supply and a vacuum supply.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein.

DETAILED DESCRIPTION

Figure 1:
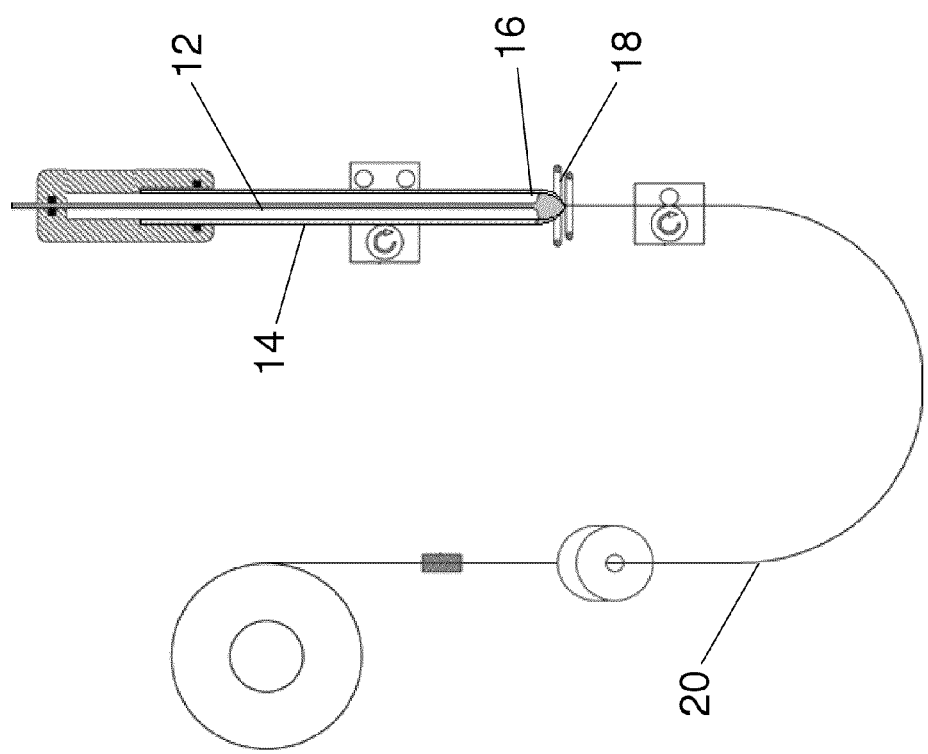
FIG. 1 illustrates an example of a schematic of the Taylor-Ulitovsky process.

The Taylor-Ulitovsky process may be used to produce relatively small diameter wire with a circular cross sections, an example of which is illustrated in FIG. 1. Generally, in the Taylor-Ulitovsky process, a charge of metal feedstock 12 in the form of a powder, ingot, or rod may be held in a glass tube 14, typically formed of a borosilicate composition, which is closed at one end 16. The closed end of the tube may be heated, such as with an induction coil 18, in order to soften the glass to a temperature at which the metal in the closed end is in a liquid state while the glass is softened, yet not melted. The glass containing the liquid melt may then be drawn down to produce a fine glass capillary containing a metal core 20 forming micro-wires. Microwires may be understood as wires having a diameter in the range of 175 µm or less, including all values and ranges therein such as from 0.1 µm to 150 µm, 10 µm, 50 µm, 100 µm, 10µ to 45 µm, etc.

At suitable drawing conditions, the molten metal may fill the glass capillary and a micro-wire may be produced where the metal core is completely coated by a glass shell. The amount of glass used in the process may be balanced by the continuous feeding of the glass tube through the inductor or heating zone, whereas the formation of the metallic core may be restricted by the initial quantity of the master alloy droplet. In addition, the microstructure of a microwire (and hence, its properties) may depend mainly on the cooling rate, which may be controlled by a cooling mechanism when the metal-filled capillary enters into a stream of cooling liquid (water or oil) on its way to the receiving spool. Relatively high cooling rates from $10^4$ to $10^6$ K/s may be obtained in the Taylor-Ulitovsky process. Metal cores in the range of 1 to 175 µm in diameter, including all values and ranges therein, with a glass coating which is typically from 2 to 35 μm in thickness, including all values and increments therein, may be produced. The glass coating may be removed mechanically or by chemical methods such as dissolving in acid.

Without being bound to any particular theory, a balance may be maintained to keep the metal droplet in an area above the bottom of the induction coil. If the metal droplet falls into the maximum field gradient of the inductor, it may overheat and, through direct thermal contact, the glass covering may overheat, soften, and break. Alternatively, if the metal droplet rises to an area too high above the inductor, the field gradients may be reduced and the metal droplet may cool, which may lead to cooling of the coating glass to a temperature where it may no longer be visco-elastic and the glass breaks.

The upwards forces on the metal droplet may be created by a balance between the levitation force due to the field gradient from the induction coil and the applied negative pressure gradient (i.e. vacuum pressure) while the downwards force arises from gravity effect consistent with the size of the liquid metal droplet. While the levitation force may be varied by changing inductor design or power levels, in practice the negative pressure gradient may be changed by changing the vacuum pump speed. The problem with this approach is that it may be difficult to carefully adjust this vacuum pressure. If it is too high, venting may be necessary which may be primarily done through backfilling with air. In this case, if initially created inert atmosphere is used, it might be lost through the air venting process. Additionally, the vent orifice which represents a restriction may be prone to plugging and inconsistent sizing on existing equipment. These factors may result in process instability and an inability to produce relatively consistent and long wire lengths due to the change in the liquid metal droplet position in the inductor zone, which may cause both changes in metal core and glass coating thickness and additionally result in breakage.

Figure 2:
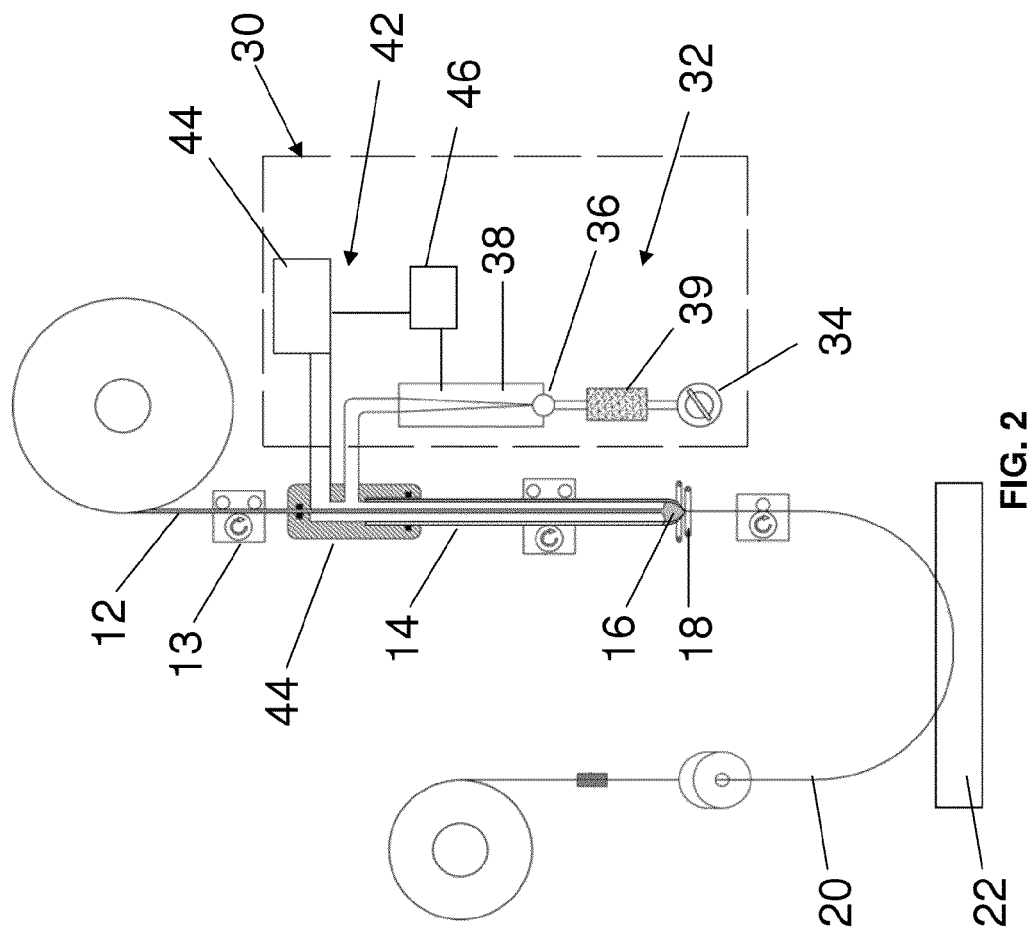
FIG. 2 illustrates an example of a schematic of the Taylor-Ulitovsky process showing improvements including cored wire feedstock and a gas pressure control system.

With this in mind, FIG. 2 illustrates another embodiment of the Taylor-Ulitovsky wire making process including a pressure control system to form a vacuum or apply pressure with inert gas. The charge of metal feedstock 12, which in this illustration is fed from a spool, may be provided by a feed drive 13 into the wire making process. The spool may include wire, such as cored wire (discussed further below). The metal feedstock 12 may be held in a glass tube 14, which may be formed from borosilicate glass, aluminosilicate glass, or glass with oxides of alkali metals. The glass tube may be closed at one end 16, which may be heated, such as with an induction coil or other heating device 18 in order to soften the glass to a temperature at which the metal near the end 16 of the glass tube is in liquid state while the glass is softened yet not melted. The glass containing the liquid melt may then be drawn down to produce a fine glass capillary containing a metal core 20.

As noted above, an inert environment may be provided inside of the glass tube containing the liquid metal droplet with a pressure control system 30. The pressure control system may include an inert gas supply 32 and/or a vacuum supply 42 both operatively coupled to the interior of the glass tube 14 via a manifold 44. The inert gas supply 32 may use inert gas or other gasses exhibiting low reactivity or combinations thereof, such as nitrogen, helium, neon, argon, etc. The inert gas may be provided from a storage tank through a regulator 34, such as a two-stage regulator. A sized needle valve 36 may be operatively coupled either directly or indirectly to the regulator 34 through tubing or other fluid conduit to provide a steady flow of gas to a flow meter 38. The needle valve 36 may also be operatively coupled directly or indirectly to the precision control flow meter 38 through tubing or other conduit. The flow meter 38 may allow relatively precise injection pressure control to provide control of the negative pressure by balance of vacuum pressure created by the vacuum pump and a positive pressure gradient arising from the bleeding of the inert gas. A moisture filter 39 may also be coupled to the inert gas supply 32 to remove moisture from the inert gas preventing the introduction of oxides to the metal alloy feedstock. The vacuum supply 40 may include a vacuum pump 42, such as a variable speed pump. Control circuitry 46, which may include a switch, pressure sensor or other components, may be utilized to maintain the pressure within the pressure control system 30 and the glass tube 14.

The pressure control system may enhance the stability of the process resulting in the ability to produce relatively long wire lengths with relatively consistent wire core diameters, which diameter may vary in a range of less than 5 microns, such as 3 microns, 2 microns, etc. or plus or minus 10% or less including all values and ranges, such as plus or minus 5%, plus or minus 3%, etc. The presence of the inert environment may also aid in preventing the formation of metal oxides/nitrides. While a certain amount of oxides/nitrides may be tolerated in conventional metal systems, in glass forming alloys, the presence of the oxides/nitrides can be especially detrimental since they can be sites for heterogeneous nucleation. Metallic glasses may form when nucleation during solidification is avoided. Crystalline oxides in the metallic glass melt may result in heterogeneous nucleation and subsequent rapid growth resulting in the formation of coarse microscale structures.

Figure 3:
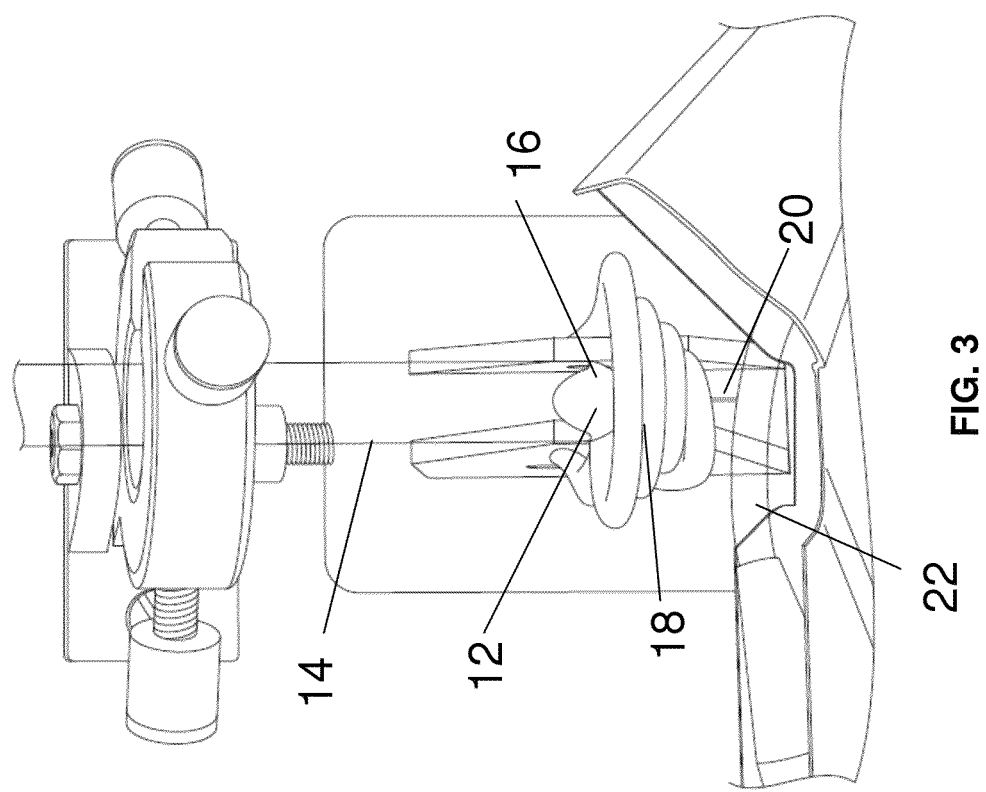
FIG. 3 illustrates an example of ALLOY C being produced into a microwire through the drop method.

In addition, multiple feeding processes are contemplated herein to provide the charge of metal feedstock to the system. For example as illustrated in FIG. 3, Taylor-Ulitovsky wire production may use a single ingot charge 12 to form a wire 20, which may be understood as the drop method. The drop method may work relatively well but the quantity of wire produced may be limited by the size of the drop, which in turn may be limited by the maximum levitation force from the induction coil coupled with the negative pressure gradient.

Figure 4:
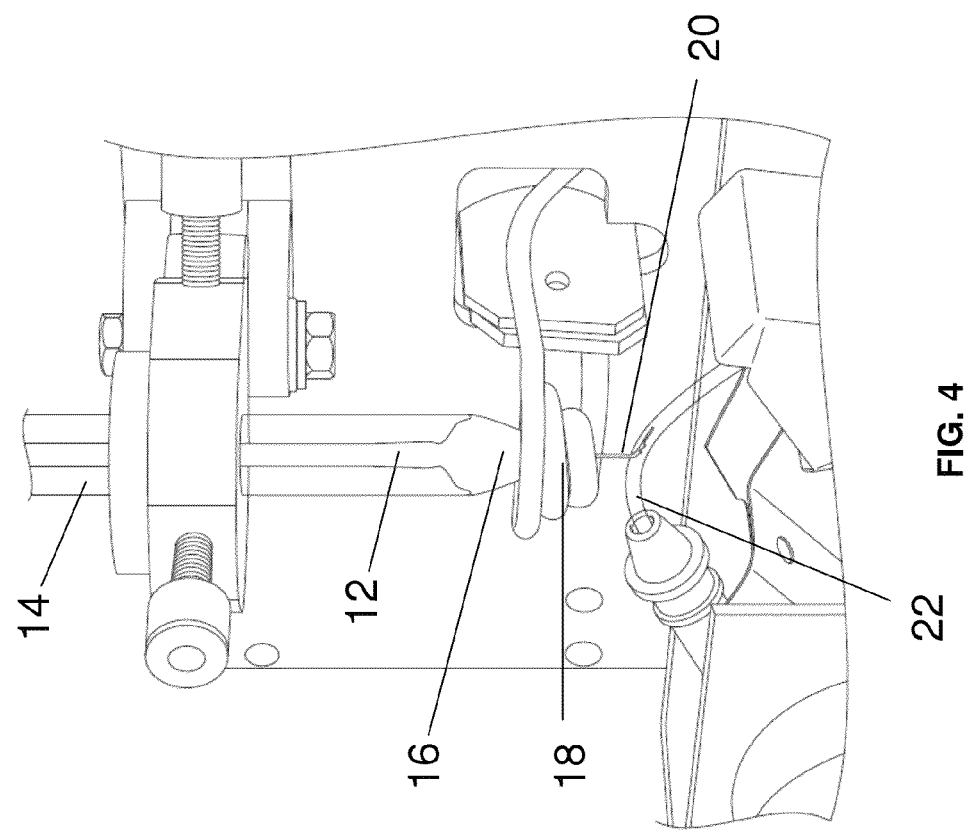
FIG. 4 illustrates an example of ALLOY B being produced into a microwire through the rod method.

Another feeding process illustrated in FIG. 4, called the rod method may be used. The rod method may be understood as a method wherein feedstock rods 12 may be fed axially down the glass tube 14 to re-supply the charge. During operation, a relatively small ingot may be placed on the bottom of the tube to supply the initial charge. After melting the ingot and formation of the liquid metal droplet, the rod may be moved down close to the droplet to allow it to first heat up from a combination of radiative heat and leakage flux. After the rod is hot, it may be brought slowly in contact with the initial charge as illustrated in FIG. 4. A steady state process may occur allowing continuous feeding of the melt so that the melt may not change in size or mass. A relatively delicate balance may be obtained via the rod feeding rate, glass traverse rate and the wire-drawing rate in order to achieve continuous production.

Yet another example of a feeding process includes the use of continuous wire, as illustrated in FIG. 2. Continuous wire may be understood as wire having a length in the range of 0.5 meters or greater, such as 0.5 meters to 1,000 km, including all values and ranges therein. Continuous wires may be supplied to the Taylor-Ulitovsky process, which are formed from relatively ductile metals and made through conventional manufacturing techniques such as wire drawing and extrusion processes. To make up wires of more complex chemistries, less ductile and less brittle materials, cored wire manufacturing may be used.

In an example of a wire manufacturing technique, a standard strip material may be selected which may be drawable and extrudable. Powder feedstock, which may be a single powder or a multicomponent powder (typically from 3 to 10 constituents but can be more), may be added to the wire. Note, while the strip or individual powder components may not be at the target chemistry, the cored wire may be made up to allow melting of the powder mixture and strip to hit the targeted chemistry. By this route, varied and complex chemistries may be created.

In the cored wire manufacturing process, the first step may be to from the flat metal strip into a U-profile. The mixed feedstock powder may then be fed into the U-shaped profile. The powder may then be fed into the wire through belts or hoppers at targeted fill ratios which may be in the range of 30 to 70%, including all values and increments therein, depending on the targeted chemistry. The U-shaped wire strip containing the feedstock powder may then be drawn closed and may go through several subsequent drawing steps to hit the targeted diameter. Typical cored wire diameters may include 0.045" (1.2 mm), 1/16" (1.6 mm), 7/64" (2.8 mm), 1/8" (3.2 mm), and 3/16" (4.7 mm). Note that all diameters near and within these limits (i.e. 1.0 to 5.0 mm) may be possible and can be produced with the conventional cored wire process. In cored wire manufacturing, 10 lb, 25 lb, and 55 lb may be considered standard sizes for spools and 250 and 500 lb are standard sizes for drums. Cored wire spool sizes and weights may be varied anywhere in these ranges from 1 lb to 1000 lb based on the production rates and volume necessary.

The total mass of the feedstock may be a varied to obtain continuous long lengths of micro-wire. In Table 1 examples of the amount of metal feedstock required as a function of wire diameter and length is shown. For the drop method, the maximum size of the liquid metal droplet may be limited by the levitation force provided by the induction coil and the vacuum pressure applied to the droplet. Typically, the preferred metal droplet size may be in the range of 2 to 4 g, including all values and increments therein. Note that this may be increased by up to a factor of 3 based on optimization of the levitation force with coil design. For the rod method, the maximum size of the rod may be limited by the ability of the rod to be manufactured into long lengths and the system height necessary to feed straight rods into the glass tube prior to melting. For a 4.5 mm rod size, which in some examples, may be the largest for stable feeding without quenching the melt, rods may be produced in the 0.1 to 1 m length range for a total maximum mass of 135 g. In cored wire manufacturing, 10 lb, 25 lb, and 55 lb may be understood as standard sizes for spools and 500 lb drum feedstock is also standard. Thus, these feedstock types, define the limits for the maximum wire length possible as shown in Table 2. As indicated, the cored wire feedstock method may allow the formation of much longer wire lengths to enable long length wire production, especially at larger metal core diameters.

TABLE 1

Metal Feedstock (in grams) Required as a Function of Diameter and Wire Length

| Metal Core Diameter | Total Wire Length (km) | | | | | |
|---|---|---|---|---|---|---|
| (μm) | 1 | 10 | 100 | 250 | 500 | 750 |
| 10 | 0.6 (g) | 6.0 | 60.5 | 151 | 302 | 454 |
| 25 | 3.8 | 37.8 | 378 | 945 | 1890 | 2835 |
| 50 | 15.1 | 151 | 1512 | 3780 | 7560 | 11339 |

TABLE 1-continued

Metal Feedstock (in grams) Required as a Function of Diameter and Wire Length

| Metal Core Diameter | Total Wire Length (km) | | | | | |
|---|---|---|---|---|---|---|
| (μm) | 1 | 10 | 100 | 250 | 500 | 750 |
| 75 | 34.0 | 340 | 3402 | 8504 | 17009 | 25513 |
| 100 | 60.5 | 605 | 6048 | 15119 | 30238 | 45357 |

TABLE 2

Maximum Length (km) Obtainable as Function of Metal Core/Melting Method

| Metal Core Diameter (μm) | Drop Method | Rod Method | Cored Wire Method (25 lb spool) |
|---|---|---|---|
| 10 | 5.8 | 223.0 | >175,000 |
| 25 | 0.9 | 35.8 | >30,000 |
| 50 | 0.2 | 8.9 | >7,500 |
| 75 | 0.1 | 4.0 | >3,250 |
| 100 | 0.06 | 2.2 | >1,750 |

The Taylor-Ulitovsky process may also be performed with or without liquid cooling. The cooling rate may be a relatively important factor in achieving a glass structure. While, water and oil are understood to be common cooling liquids, in glass forming systems oil may not be as commonly used as the cooling rate exhibited by oil may be less than water and oil may degrade and may promote oxidation. Brine solutions may also be used as a cooling medium and the cooling rates of brine solutions may be much higher than those found in water solutions. A comparison between examples of the maximum heat flux with water and specific brine solutions is shown in Table 3. As the maximum heat flux increases, the cooling rate may increase. The brine solution may include aqueous salts solutions of sodium chloride and potassium chloride. Referring to FIGS. 2, 3 and 4, a brine solution 22 may be contacted with the drawn wire to cool the wire 20. As illustrated in FIG. 2, the brine solution 22 may be provided in a bath in which the wire 20 may be immersed. In another embodiment, illustrated in FIGS. 3 and 4, the brine solution 22 may be provided in a stream in which the drawn wire 20 may be at least partially immersed.

For example, it may be understood that the maximum cooling rate provided by water quenching was determined to be 400° C./s but with a 15% NaCl solution or a 15% NaOH solution the maximum cooling rates were 2550° C./s and 2450° C./s, respectively. Thus, by using salt brine solutions in the Taylor-Ulitovsky process, the cooling rates during wire production may be increased as well to enable glass formation at relatively larger wire diameters.

TABLE 3

Comparison of Maximum Heat Flux in Various Solutions

| Solution | Maximum Heat Flux (mW/m$^2$) |
|---|---|
| Water | 8 |
| Water + 10% NaCl | 13 |
| Water + 23% LiCl | 9.5 |
| Water + 14% MgCl$_2$ | 13 |
| Water + 10-12% CaCl$_2$ | 14 |
| Water + 8-10% NaOH | 15 |

The metal feedstock alloys utilized in forming the microwires herein may include glass forming chemistries leading to Spinodal Glass Matrix Microconstituent (SGMM) structures which may have relatively significant ductility and relatively high tensile strength. Spinodal microconstituents may be understood as microconstituents formed by a transformation mechanism which is not nucleation controlled. More basically, spinodal decomposition may be understood as a mechanism by which a solution of two or more components (e.g. metal compositions) of the alloy can separate into distinct regions (or phases) with distinctly different chemical compositions and physical properties. This mechanism differs from classical nucleation in that phase separation occurs uniformly throughout the material and not just at discrete nucleation sites. One or more semicrystalline clusters or crystalline phases may therefore form through a successive diffusion of atoms on a local level until the chemistry fluctuations lead to at least one distinct crystalline phase. Semicrystalline clusters may be understood herein as exhibiting a largest linear dimension of 2 nm or less, whereas crystalline clusters may exhibit a largest linear dimension of greater than 2 nm. Note that during the early stages of the spinodal decomposition, the clusters which are formed are small and while their chemistry differs from the glass matrix, they are not yet fully crystalline and have not yet achieved well ordered crystalline periodicity. Additional crystalline phases may exhibit the same crystal structure or distinct structures. Furthermore the glass matrix may be understood to include microstructures that may exhibit associations of structural units in the solid phase that may be randomly packed together. The level of refinement, or the size, of the structural units may be in the angstrom scale range (i.e. 5 Å to 100 Å).

The ductile range may be found to occur when iron is at least 35 atomic percent (at %), when nickel and/or cobalt is in the range of 7 to 50 at %; when at least one non/metal or metalloid selected from the group consisting of B, C, Si, P, and/or N present in the range of 1 to 35 at %, and when one metal selected from the group consisting of W, Cr, Cu, Ti, Mo, Y, and/or Al present in the range of about 0 to 25 at %. In some examples, the alloy chemistries may include, consist essentially of or be limited to iron present in the range of 43 atomic percent to 68 atomic percent, boron present in the range of 12 atomic percent to 17 atomic percent, carbon optionally present in the range of 1.5 atomic percent to 5 atomic percent, silicon optionally present in the range of 0.4 atomic percent to 4 atomic percent, nickel present in the range of 16 atomic percent to 17 atomic percent and cobalt optionally present in the range of 2 atomic percent to 21 atomic percent.

In some examples, the alloy chemistries may preferably include, consist essentially of or be limited to iron present in the range of 49 through 66 at %, boron present in the range of 12 to 17 at %, carbon optionally present in the range of 4 to 5 at %, silicon present in the range of 0.4 to 4 at %, nickel present in the range of 16 to 17 at %, cobalt present in the range of 3 to 12 at % and chromium optionally present in the range of 2.9 to 3.1 at %. All elemental constituents may be present at a range or increment in the ranges above, including increments of 0.1 at %. Accordingly, in some embodiments, iron may be present at 49.0, 49.1, 49.2, 49.3, 49.4, 49.5, 49.6, 49.7, 49.8, 49.9, 50.0, 50.1, 50.2, 50.3, 50.4, 50.5, 50.6, 50.7, 50.8, 50.9, 51.0, 51.1, 51.2, 51.3, 51.4, 51.5, 51.6, 51.7, 51.8, 51.9, 52.0, 52.1, 52.2, 52.3, 52.4, 52.5, 52.6, 52.7, 52.8, 52.9, 53.0, 53.1, 53.2, 53.3, 53.4, 53.5, 53.6, 53.7, 53.8, 53.9, 54.0, 54.1, 54.2, 54.3, 54.4, 54.5, 54.6, 54.7, 54.8, 54.9, 55.0, 55.1, 55.2, 55.3, 55.4, 55.5, 55.6, 55.7, 55.8, 55.9, 56.0, 56.1, 56.2, 56.3, 56.4, 56.5, 56.6, 56.7, 56.8, 56.9, 57.0, 57.1, 57.2, 57.3, 57.4, 57.5, 57.6, 57.7, 57.8, 57.9, 58.0, 58.1, 58.2, 58.3, 58.4, 58.5, 58.6, 58.7, 58.9, 59.0, 59.1, 59.2, 59.3, 59.4, 59.5, 59.6, 59.7, 59.8, 59.9, 60.0, 60.1, 60.2, 60.3, 60.4, 60.5, 60.6, 60.7, 60.8, 60.9, 61.0, 61.1, 61.2, 61.3, 61.4, 61.5, 61.6, 61.7, 61.8, 61.9, 62.0, 62.1, 62.2, 62.3, 62.4, 62.5, 62.6, 62.7, 62.8, 62.9, 63.0, 63.1, 63.2, 63.3, 63.4, 63.5, 63.6, 63.7, 63.8, 63.9, 64.0, 64.1, 64.2, 64.3, 64.4, 64.5, 64.6, 64.7, 64.8, 64.9, 65.0, 65.1, 65.2, 65.3, 65.4, 65.5, 65.6, 65.7, 65.8, 65.9, 66.0 at %, boron may be present at 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0 at %, carbon may be present at 0.0 at %, 4.0, 4.1, 4.2, 4.3, 4.4, 4.5, 4.6, 4.7, 4.8, 4.9, 5.0 at %, silicon may be present in the range of 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0 at %, nickel may be present at 16.0, 16.1, 16.2, 16.3, 16.4, 16.5, 16.6, 16.7, 16.8, 16.9, 17.0 at %, cobalt may be present at 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0 at % and chromium may be present at 0.0, 2.5, 2.6, 2.7, 2.8, 2.9, 3.0, 3.1, 3.2, 3.3, 3.4, 3.5 at %. The alloy chemistries may exhibit an elongation in the range of 0.26 mm to 2.50 mm, a percent elongation in the range of 1.93 to 12.8% and an ultimate tensile strength in the range of 2.32 to 5.82 GPa.

Other alloy chemistries contemplated herein for use in the Taylor-Ulitovsky microwire production process may include, consist essentially of, or be limited to iron present in the range of 43 at % to 68 at %, boron present in the range of 12 at % to 19 at %, carbon may be optionally present in the range of 1 at % to 5 at % if present, silicon optionally present in the range of 0.4 at % to 4.0 at % if present, nickel present in the range of 16 at % to 17 at % and cobalt present in the range of 2 at % to 21 at %, including all ranges and increments therein at 0.1 increments. Accordingly, it may be appreciated that iron may be present in at 43.0, 43.1, 43.2, 43.3, 43.4, 43.5, 43.6, 43.7, 43.8, 43.9, 44.0, 44.1, 44.2, 44.3, 44.4, 44.5, 44.6, 44.7, 44.8, 44.9, 45.0, 45.1, 45.2, 45.3, 45.4, 45.5, 45.6, 45.7, 45.8, 45.9, 46.0, 46.1, 46.2, 46.3, 46.4, 46.5, 46.6, 46.7, 46.8, 46.9, 47.0, 47.1, 47.2, 47.3, 47.4, 47.5, 47.6, 47.7, 47.8, 47.9, 48.0, 48.1, 48.2, 48.3, 48.4, 48.5, 48.6, 48.7, 48.8, 48.9, 49.0, 49.1, 49.2, 49.3, 49.4, 49.5, 49.6, 49.7, 49.8, 49.9, 50.0, 50.1, 50.2, 50.3, 50.4, 50.5, 50.6, 50.7, 50.8, 50.9, 51.0, 51.1, 51.2, 51.3, 51.4, 51.5, 51.6, 51.7, 51.8, 51.9, 52.0, 52.1, 52.2, 52.3, 52.4, 52.5, 52.6, 52.7, 52.8, 52.9, 53.0, 53.1, 53.2, 53.3, 53.4, 53.5, 53.6, 53.7, 53.8, 53.9, 54.0, 54.1, 54.2, 54.3, 54.4, 54.5, 54.6, 54.7, 54.8, 54.9, 55.0, 55.1, 55.2, 55.3, 55.4, 55.5, 55.6, 55.7, 55.8, 55.9, 56.0, 56.1, 56.2, 56.3, 56.4, 56.5, 56.6, 56.7, 56.8, 56.9, 57.0, 57.1, 57.2, 57.3, 57.4, 57.5, 57.6, 57.7, 57.8, 57.9, 58.0, 58.1, 58.2, 58.3, 58.4, 58.5, 58.6, 58.7, 58.8, 58.9, 59.0, 59.1, 59.2, 59.3, 59.4, 59.5, 59.6, 59.7, 59.8, 59.9, 60.0, 60.1, 60.2, 60.3, 60.4, 60.5, 60.6, 60.7, 60.8, 60.9, 61.0, 61.1, 61.2, 61.3, 61.4, 61.5, 61.6, 61.7, 61.8, 61.9, 62.0, 62.1, 62.2, 62.3, 62.4, 62.5, 62.6, 62.7, 62.8, 62.9, 63.0, 63.1, 63.2, 63.3, 63.4, 63.5, 63.6, 63.7, 63.8, 63.9, 64.0, 64.1, 64.2, 64.3, 64.4, 64.5, 64.6, 64.7, 64.8, 64.9, 65.0, 65.1, 65.2, 65.3, 65.4, 65.5, 65.6, 65.7, 65.8, 65.9, 66.0, 66.1, 66.2, 66.3, 66.4, 66.5, 66.6, 66.7, 66.8, 66.9, 67.0, 67.1, 67.2, 67.3, 67.4, 67.5, 67.6, 67.7, 67.8, 67.9, 68.0 at %, boron may be present at 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0 at %, carbon may be present at 0.0, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0 at %, silicon may be present at 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0 at %, nickel may be present at 16.0, 16.1, 16.2, 16.3, 16.4, 16.5, 16.6, 16.7, 16.8, 16.9, 17.0 at % and cobalt may be present at 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0 at %. The compositions may exhibit a total elongation of 1.7% or greater, such as in the range of 1.7 to 6.8%, including all values and increments therein. In addition, the compositions may exhibit an ultimate tensile strength of 1.3 GPa or greater, such as in the range of 1.3 GPa to 3.5 GPa, including all values and increments therein.

Specific alloy chemistries that may lead to spinodal glass matrix microconstituent structures having relatively high ductility and tensile strength include the formulations outlined in Table 4.

TABLE 4

Atomic Ratio's for Alloys

| Alloy | Fe | B | C | Si | Ni | Co | Cr |
|---|---|---|---|---|---|---|---|
| ALLOY A | 65.03 | 15.00 | — | 0.47 | 16.50 | 3.00 | — |
| ALLOY B | 51.01 | 16.49 | — | 4.00 | 16.50 | 12.00 | — |
| ALLOY C | 62.00 | 12.49 | 4.54 | 0.47 | 16.11 | 4.39 | — |
| ALLOY D | 49.48 | 16.00 | — | 3.87 | 16.01 | 11.64 | 3.00 |

The tensile properties of the micro-wires produced from the alloys shown in Table 4 are listed in Case Example 3, below. As shown, the tensile strength values for the microwires may be relatively high and vary from 2.3 GPa to 5.8 GPa while the total elongation values may also be relatively significant and vary from 1.9% to 12.8%.

The wire formed by the methods described herein may exhibit a percent elongation in the range of 1.7% to 12.8% including all values and ranges therein and/or an ultimate tensile strength in the range of 1.3 GPa to 5.8 GPa including all values and ranges therein. The wire formed by the methods described herein may exhibit a length of 1,000 km or less, including all values and ranges. The resulting wire may exhibit a length of 0.5 meters or greater, including all values and ranges. For example, the wire may be in the range of 0.5 m to 1,000 km, 100 km to 1,000 km, 10 km to 100 km, etc. In addition, as noted above, the wire may exhibit a diameter in the range of 1 μm to 150 μm including all values and ranges therein. Further, the wire may exhibit a variation in the diameter over the wire length of plus or minus 10 percent, including all values and ranges therein, such as plus or minus 5 percent, etc. For example, for a length of wire of 600 meters, the variation in diameter may be 5 microns or less.

Furthermore, the glass forming chemistries upon formation of micro-wires may exhibit in the range of 2% to 90% by volume, including all values and ranges therein, of nanocrystalline phase microstructures, the remaining exhibiting glass phases. The nanocrystalline phase microstructures may exhibit a size in the range of 1 nm to 20 nm, including all values and increments therein. The glass phases are defined herein as having atomic ordering on a scale of less than 1.0 nm. In some embodiments, the structure may include or consist essentially of periodic nanocrystalline clusters having a thickness to length ratio of 1:1 to 1:5, including all values and increments therein. For example, the structure may include periodic nanocrystalline phases of 2 nm to 3 nm thick and 2 nm to 10 nm long. The resulting microwire may exhibit a diameter in the range of 0.001 mm to 0.150 mm, including all values and ranges therein.

This may now open up applications for micro-wires produced by the Taylor-Ulitovsky process which may not have been previously possible. One envisioned application may include utilizing the finer metal core wire of diameters of less than 50 μm as a replacement fiber for high strength carbon based fibers such as Kevlar, Spectra, Technora etc. While the diameter targets may currently be in the ranges common in Taylor-Ulitovsky, this type of application may require relatively greater wire uniformity as macro-defects in the wire may result in reduced lower tensile strengths. Another envisioned example may be to utilize larger metal core wire diameters (>40 μm) in wire-saws for cutting relatively high value materials like silicon wafers for industrial solar cells. In this case, the diameters may be at the edge of the known Taylor-Ulitovsky range and the wire length requirements may be greater. While commonly Taylor-Ulitovsky may be used to process wire spool lengths in the range of 0.5 to 1.0 km (and up to 5 km), the required length for a wire saw for silicon cutting may be in the range of 250 to 750 km. Thus, while chemistries and metallurgical structures may enable new uses of microwire, improved control of the Taylor-Ulitovsky process may be an important factor to achieve commercial products.

EXAMPLES

The following examples are for illustrative purposes and are not meant to limit the scope of the disclosure or claims appended hereto.

Case Example #1

Figure 5:
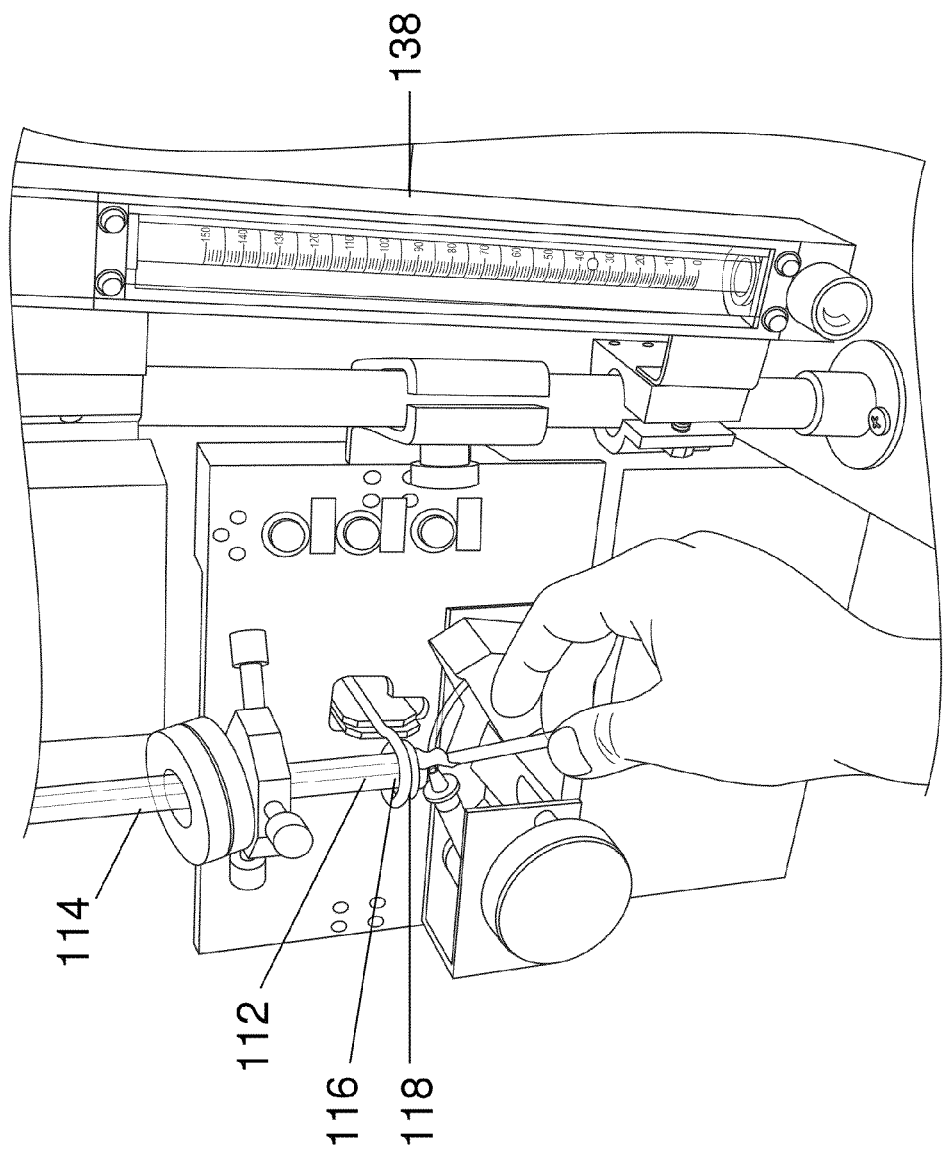
FIG. 5 illustrates an example of Taylor-Ulitovsky process machine running with an example of a precision control system.

An example of a pressure control system shown in FIG. 5 was installed onto an existing Taylor-Ulitovsky process machine. Specific components of the pressure control system may include a precision control flow meter, two stage gas regulator, custom fit pressure fitting with tubing, O-ring assortment, groove tool and lube, ¼" tubing, fittings and clamps, and a 1½"diameter, PVC rod to fabricate pressure fittings. The pressure control system may allow precision inert gas pressure control enabling precise control of the liquid metal droplet position in an induction coil to provide a relatively stable melting process.

Specifically, the Taylor-Ulitovsky process machine includes an induction coil 118 used to soften the glass 114 and melt the metal charge near 112 the end 116 of the glass tube 114. The pressure control system 130 included an inert gas supply and a vacuum supply both operatively coupled to the glass tube 114 via a manifold (not illustrated). Inert gas was supplied from a storage tank through a two-stage regulator. A needle valve was operatively coupled to the regulator and flow meter 138, which was coupled to the glass tube 114. A moisture filter was also coupled to the inert gas supply between the regulator and the needle valve. The vacuum supply included a variable speed vacuum pump.

Case Example #2

Figure 6:
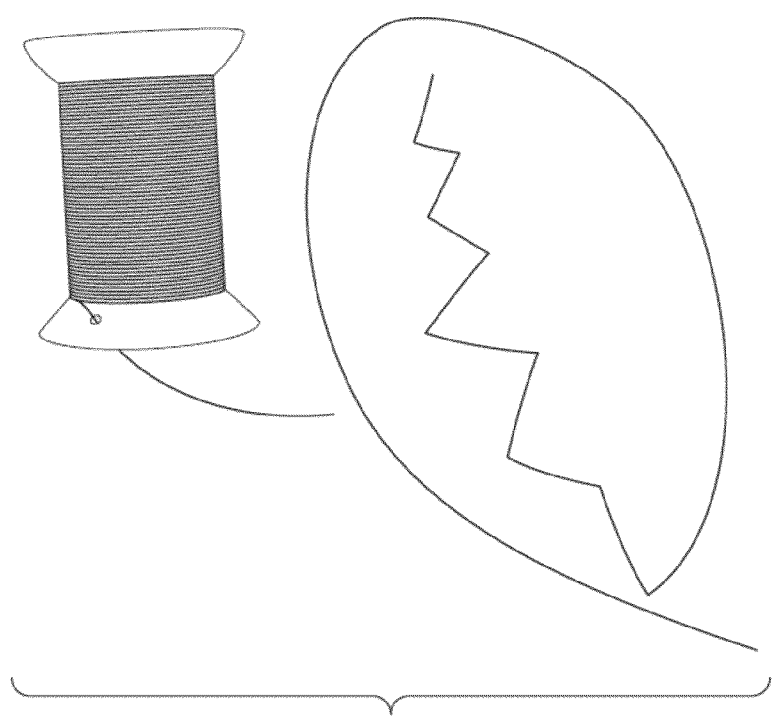
FIG. 6 illustrates an example of microwire with mean core diameter of 70 µm from glass forming alloy.

Using the Taylor-Ulitovsky process described, a wide range of wire was produced using a wide variety of parameter variations including variations in the liquid metal droplet position inside the inductor, melt temperature superheat, glass feed velocity, vacuum pressure force, spool winding velocity, glass feedstock type etc. The compositions outlined above in Table 1 were utilized to form the microwires In Table 5, a summary of example parameters of produced micro-wires is given. As can be seen, the metal core diameter varied from 3.6 to 162 µm while the total wire diameter (i.e. with glass coating) varied from 14 to 182 µm. The length of the wire produced varied from 28 to 7500 m depending on the stability of the process conditions. An example of the wire produced on a spool is shown in FIG. 6. The ability of the wire to be bendable and have significant ductility may be observed in the figure with the bent segments of wire shown.

TABLE 5

Summary of Wire Size Production Data

| | | Initial Wire (µm) | | Final Wire (µm) | |
|---|---|---|---|---|---|
| Alloy | Wire Length (m) | Metal Core | Total Diameter | Metal Core | Total Diameter |
| ALLOY A | 161 | 13.3 | 52.9 | 24.8 | 52.2 |
| ALLOY B | 220 | 35.6 | 56.2 | 40.7 | 50.4 |
| ALLOY B | 550 | 15.4 | 34.9 | 20.2 | 29.9 |
| ALLOY B | 190 | 19.8 | 65.9 | 37.1 | 60.8 |
| ALLOY B | 1309 | 23.4 | 42.4 | 22.0 | 42.1 |
| ALLOY B | 1015 | 21.2 | 46.4 | 24.1 | 42.5 |
| ALLOY B | 1476 | 22.3 | 56.5 | 14.4 | 52.5 |
| ALLOY B | 340 | 28.1 | 44.3 | 21.6 | 41.0 |
| ALLOY B | 540 | 20.1 | 50.0 | 12.2 | 46.1 |
| ALLOY B | 323 | 22.6 | 36.4 | 20.5 | 38.5 |
| ALLOY B | 7500 | N/A | N/A | 3.6 | 14.4 |
| ALLOY D | 82 | 50.0 | 116.3 | 35.3 | 103.7 |
| ALLOY D | 90 | 70.5 | 128.2 | 74.2 | 141.1 |
| ALLOY B | 52 | 74.1 | 117.0 | 53.6 | 93.2 |
| ALLOY B | 37 | 64.4 | 103.3 | 52.2 | 111.2 |
| ALLOY B | 50 | 71.6 | 102.9 | 57.9 | 97.9 |
| ALLOY D | 55 | 55.1 | 109.8 | 36.7 | 89.6 |
| ALLOY B | 200 | 42.8 | 63.4 | 40.3 | 61.2 |
| ALLOY D | 90 | 39.2 | 84.6 | 31.6 | 72.3 |
| ALLOY D | 559 | 16.9 | 35.2 | 16.2 | 31.6 |
| ALLOY B | 554 | 28.1 | 48.6 | 15.1 | 25.9 |
| ALLOY B | 845 | 22.6 | 39.2 | 26.6 | 42.8 |
| ALLOY B | 670 | 25.2 | 49.0 | 14.7 | 41 |
| ALLOY B | 1740 | 22.0 | 47.5 | 19.8 | 38.2 |
| ALLOY B | 1030 | 23.4 | 27.0 | 22.3 | 28.4 |
| ALLOY B | 600 | 23.8 | 36 | 17.6 | 38.5 |
| ALLOY B | 710 | 25.5 | 42.4 | 25.2 | 41.0 |
| ALLOY B | 1350 | 24.5 | 45.0 | 18.4 | 30.9 |
| ALLOY B | 28 | 52.2 | 99.0 | 161.6 | 181.8 |
| ALLOY B | 50 | 77.0 | 95.7 | 63.7 | 97.9 |
| ALLOY B | 90 | 66.9 | 97.9 | 81.4 | 127.1 |

Figure 7:
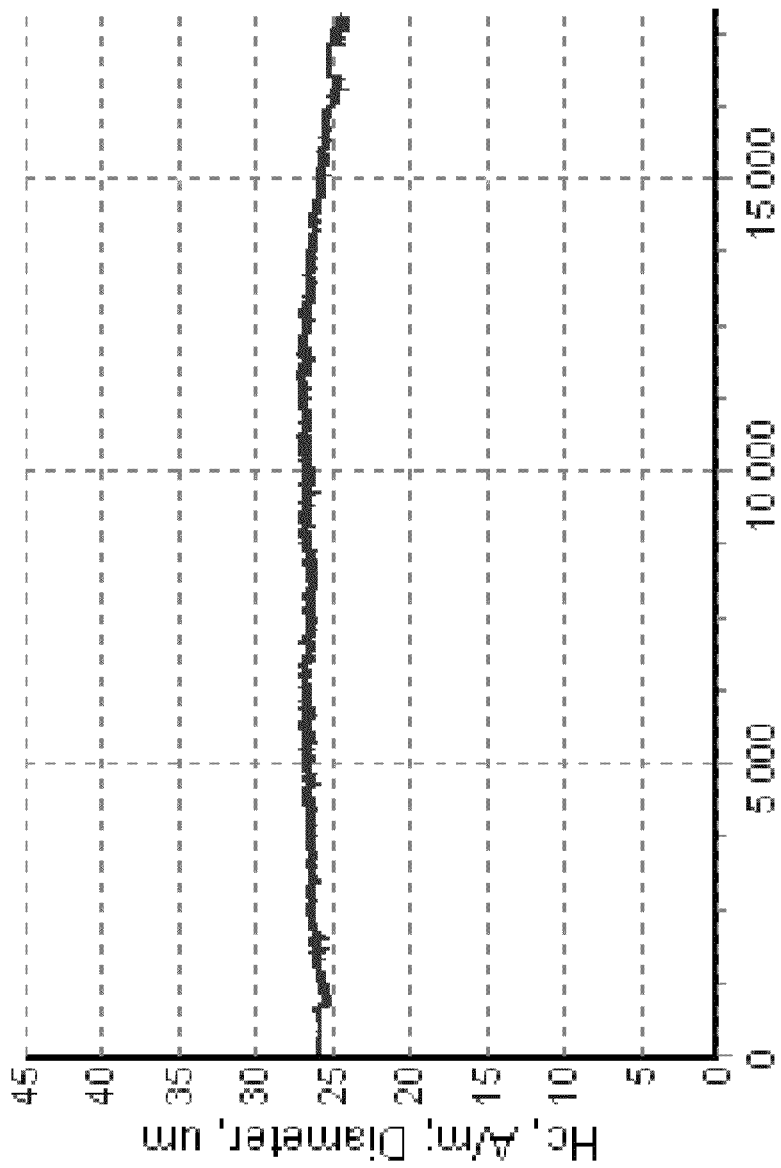
FIG. 7 illustrates an example of microwire core diameter variations over a long spool length of 0.6 km.

The metal core diameter measurements measured for a sample of ALLOY B over a 0.6 km spool length is illustrated in FIG. 7. As shown, the metal core wire diameter is held within 3 µm over the entire spool length. It may be appreciated that the metal core wire diameter may be held within a range of 1 µm to 5 µm over an entire spool length. Thus, relatively consistent diameter may be maintained over relatively long wire lengths.

Case Example #3

The mechanical properties of metallic ribbons were measured at room temperature using microscale tensile testing. The testing was carried out in a commercial tensile stage made by Ernest Fullam, Inc., which was monitored and controlled by MTEST Windows software program. The deformation was applied by a stepping motor through the gripping system while the load was measured by a load cell that was connected to the end of one gripping jaw. Displacement was obtained using a Linear Variable Differential Transformer (LVDT) which was attached to the two gripping jaws to measure the change of gauge length. Before testing, the diameter of each wire was carefully measured at least three times at different locations in the gauge length. The average values were then recorded as gauge diameter and used as input for subsequent stress and strain calculation. All tests were performed under displacement control, with a strain rate of ~0.001 s$^{-1}$. A summary of the tensile test results including the wire diameter (metal core and total), measured gauge length, total elongation, applied load (preloading and peak loading) and measure strength (yield stress and ultimate tensile strength) are given in Tables 6 through 9. As can be seen, the tensile strength values are relatively high and vary from 2.3 GPa to 5.8 GPa while the total elongation values may also be relatively significant, varying from 1.9% to 12.8%.

TABLE 6

Tensile Properties of ALLOY C Micro-wires

| Diameters (mm) | | Gage length | Elongation | | Load (N) | | Strength (GPa) | |
|---|---|---|---|---|---|---|---|---|
| Outside | Core | (mm) | (mm) | (%) | Pre | Peak | Yield | UTS |
| 0.051 | 0.03 | 26.0 | 1.31 | 5.07 | N/A | 2.919 | 1.36 | 4.13 |
| 0.051 | 0.027 | 28.0 | 1.75 | 6.25 | N/A | 2.293 | 1.39 | 4.01 |
| 0.048 | 0.025 | 31.0 | 1.79 | 5.77 | N/A | 2.006 | N/A | 4.09 |
| 0.048 | 0.022 | 11.8 | 0.66 | 5.77 | 0.145 | 1.315 | N/A | 3.84 |
| 0.048 | 0.022 | 12.1 | 1.00 | 8.28 | 0.107 | 1.344 | N/A | 3.82 |
| 0.048 | 0.022 | 19.8 | 0.75 | 3.79 | 0.088 | 0.940 | N/A | 2.71 |
| 0.051 | 0.031 | 14.5 | 1.29 | 8.90 | 0.107 | 2.872 | N/A | 3.95 |
| 0.048 | 0.028 | 14.2 | 1.20 | 8.43 | 0.443 | 2.210 | N/A | 4.31 |
| 0.048 | 0.028 | 16.1 | 1.71 | 10.62 | 0.254 | 2.267 | N/A | 4.10 |
| 0.061 | 0.035 | 40.0 | 0.77 | 1.93 | 0.039 | 3.214 | 1.24 | 3.38 |
| 0.053 | 0.035 | 40.0 | 1.27 | 3.18 | 0.046 | 3.246 | 1.46 | 3.42 |
| 0.034 | 0.022 | 26.0 | 1.46 | 5.62 | 0.063 | 1.769 | N/A | 4.82 |
| 0.034 | 0.022 | 24.4 | 2.16 | 8.85 | 0.041 | 1.719 | N/A | 4.63 |
| 0.038 | 0.021 | 14.0 | 0.49 | 3.50 | 0.023 | 1.079 | N/A | 3.18 |
| 0.038 | 0.021 | 12.1 | 0.71 | 5.87 | 0.069 | 1.025 | N/A | 3.16 |
| 0.038 | 0.021 | 10.0 | 0.63 | 6.30 | 0.092 | 0.965 | N/A | 3.05 |
| 0.038 | 0.021 | 16.8 | 0.57 | 3.39 | 0.061 | 1.162 | N/A | 3.53 |
| 0.038 | 0.021 | 10.9 | 1.00 | 9.17 | 0.129 | 0.966 | N/A | 3.16 |
| 0.038 | 0.021 | 12.0 | 0.74 | 6.17 | 0.03 | 1.166 | N/A | 3.45 |

TABLE 7

Tensile Properties of ALLOY A Micro-wires

| Diameters (mm) | | Gage Length | Elongation | | Load (N) | | Strength (GPa) | |
|---|---|---|---|---|---|---|---|---|
| Outside | Core | (mm) | (mm) | (%) | Pre | Peak | Yield | UTS |
| 0.051 | 0.021 | 20.00 | N/A | N/A | N/A | 1.456 | N/A | 4.21 |
| 0.051 | 0.021 | 20.00 | 0.67 | 3.45 | N/A | 0.992 | 1.28 | 2.87 |

TABLE 7-continued

Tensile Properties of ALLOY A Micro-wires

| Diameters (mm) | | Gage Length | Elongation | | Load (N) | | Strength (GPa) | |
|---|---|---|---|---|---|---|---|---|
| Outside | Core | (mm) | (mm) | (%) | Pre | Peak | Yield | UTS |
| 0.054 | 0.033 | 25.00 | 2.50 | 10.05 | N/A | 4.538 | 2.14 | 4.54 |
| 0.053 | 0.033 | 30.00 | 1.81 | 6.04 | N/A | 4.389 | N/A | 5.82 |
| 0.043 | 0.013 | 11.41 | 0.95 | 8.33 | 0.080 | 0.5 | 1.59 | 4.37 |
| 0.043 | 0.013 | 15.71 | 0.84 | 5.35 | 0.031 | 0.457 | 1.82 | 3.68 |
| 0.043 | 0.013 | 11.47 | 0.74 | 6.45 | 0.035 | 0.526 | N/A | 4.23 |
| 0.057 | 0.037 | 12.11 | 1.55 | 12.80 | 0.205 | 4.454 | 1.67 | 4.34 |
| 0.057 | 0.037 | 11.22 | 1.38 | 12.30 | 0.546 | 4.287 | 1.26 | 4.50 |
| 0.057 | 0.037 | 12.93 | 1.00 | 7.73 | 1.341 | 3.282 | 1.95 | 4.30 |
| 0.054 | 0.032 | 10.33 | 0.80 | 7.74 | 0.176 | 3.56 | 1.96 | 4.65 |
| 0.054 | 0.032 | 11.53 | 0.57 | 4.94 | 0.817 | 3.623 | 2.69 | 5.52 |
| 0.054 | 0.032 | 10.31 | 0.82 | 7.95 | 0.101 | 4.212 | 2.35 | 5.37 |
| 0.044 | 0.025 | 11.53 | 0.55 | 4.77 | 0.031 | 1.418 | 1.96 | 2.95 |

TABLE 8

Tensile Properties of ALLOY B Micro-wires

| Diameters (mm) | | Gage length | Elongation | | Load (N) | | Strength (GPa) | |
|---|---|---|---|---|---|---|---|---|
| Outside | Core | (mm) | (mm) | (%) | Pre | Peak | Yield | UTS |
| 0.056 | 0.031 | 22.00 | 0.63 | 2.86 | N/A | 2.978 | 1.61 | 3.95 |
| 0.078 | 0.033 | 26.00 | 0.77 | 2.96 | N/A | 3.344 | 1.19 | 3.91 |
| 0.061 | 0.038 | 32.00 | 1.42 | 4.44 | N/A | 4.760 | N/A | 4.20 |
| 0.061 | 0.038 | 28.00 | 1.06 | 3.79 | N/A | 5.050 | N/A | 4.45 |
| 0.066 | 0.042 | 11.34 | 0.56 | 4.94 | 0.154 | 4.769 | 0.89 | 3.56 |
| 0.066 | 0.042 | 11.43 | 0.74 | 6.47 | 0.198 | 4.490 | 1.20 | 3.39 |
| 0.066 | 0.042 | 12.60 | 0.59 | 4.68 | 0.241 | 4.577 | 1.31 | 3.48 |
| 0.066 | 0.042 | 18.10 | 0.70 | 3.87 | 0.224 | 4.429 | 1.03 | 3.36 |
| 0.057 | 0.033 | 11.46 | 0.61 | 5.32 | 0.855 | 2.702 | 1.71 | 4.16 |
| 0.057 | 0.033 | 12.38 | 1.05 | 8.48 | 0.268 | 3.417 | 1.20 | 4.31 |
| 0.057 | 0.033 | 12.45 | 0.95 | 7.63 | 0.153 | 3.338 | 1.48 | 4.08 |
| 0.057 | 0.033 | 20.31 | 0.90 | 4.43 | 0.198 | 3.192 | 2.24 | 3.97 |
| 0.033 | 0.014 | 11.32 | 0.74 | 6.54 | 0.042 | 0.597 | 2.54 | 4.15 |
| 0.033 | 0.014 | 12.11 | 0.66 | 5.45 | 0.000 | 0.466 | 2.23 | 3.03 |
| 0.033 | 0.014 | 12.62 | 0.52 | 4.12 | 0.023 | 0.711 | 2.23 | 4.77 |
| 0.033 | 0.014 | 13.14 | 0.61 | 4.64 | 0.025 | 0.710 | 2.45 | 4.78 |
| 0.042 | 0.026 | 13.35 | 0.74 | 5.54 | 0.161 | 1.808 | 1.90 | 3.71 |
| 0.042 | 0.026 | 11.54 | 0.83 | 7.19 | 0.117 | 1.957 | 1.57 | 3.91 |
| 0.042 | 0.026 | 12.42 | 0.77 | 6.20 | 0.185 | 1.863 | 2.46 | 3.86 |
| 0.069 | 0.044 | 12.08 | 0.55 | 4.55 | 0.201 | 4.771 | 2.46 | 3.27 |
| 0.069 | 0.044 | 12.34 | 0.48 | 3.89 | 0.158 | 4.738 | 1.56 | 3.22 |
| 0.069 | 0.044 | 19.31 | 0.74 | 3.83 | 0.657 | 4.428 | 1.99 | 3.35 |
| 0.069 | 0.044 | 20.99 | 0.47 | 2.24 | 0.241 | 3.279 | 0.71 | 2.32 |

TABLE 9

Tensile Properties of ALLOY D Micro-wires

| Diameters (mm) | | Gage length | Elongation | | Failure Load | Strength (GPa) | |
|---|---|---|---|---|---|---|---|
| Outside | Core | (mm) | (mm) | (%) | (N) | Yield | UTS |
| 0.125 | 0.069 | 24.99 | 0.62 | 2.48 | 9.89 | 1.47 | 2.65 |
| 0.115 | 0.069 | 12.04 | 0.52 | 4.32 | 10.91 | 1.41 | 2.92 |
| 0.118 | 0.068 | 12.13 | 0.61 | 5.03 | 9.35 | 1.73 | 2.58 |
| 0.127 | 0.068 | 12.71 | 0.46 | 3.62 | 11.63 | 1.69 | 3.20 |
| 0.124 | 0.067 | 15.17 | 0.51 | 3.36 | 11.37 | 1.23 | 3.23 |
| 0.113 | 0.065 | 12.27 | 0.47 | 3.83 | 10.39 | 0.88 | 3.13 |
| 0.125 | 0.063 | 17.73 | 0.58 | 3.27 | 9.66 | 2.22 | 3.10 |
| 0.117 | 0.068 | 12.40 | 0.36 | 2.90 | 10.92 | 2.89 | 3.01 |
| 0.129 | 0.066 | 11.48 | 0.36 | 3.14 | 11.95 | 3.38 | 3.50 |
| 0.123 | 0.064 | 11.42 | 0.36 | 3.15 | 10.33 | 2.30 | 3.21 |
| 0.119 | 0.063 | 21.54 | 1.26 | 5.85 | 9.08 | 0.82 | 2.92 |
| 0.105 | 0.063 | 35.39 | 2.01 | 5.68 | 9.69 | 1.95 | 3.11 |
| 0.125 | 0.044 | 18.35 | 0.41 | 2.23 | 4.86 | 1.36 | 3.20 |

TABLE 9-continued

Tensile Properties of ALLOY D Micro-wires

| Diameters (mm) | | Gage length | Elongation | | Failure Load | Strength (GPa) | |
|---|---|---|---|---|---|---|---|
| Outside | Core | (mm) | (mm) | (%) | (N) | Yield | UTS |
| 0.115 | 0.044 | 17.34 | 0.49 | 2.83 | 5.09 | 1.24 | 3.35 |
| 0.115 | 0.043 | 12.77 | 0.40 | 3.13 | 4.91 | 1.38 | 3.38 |
| 0.115 | 0.043 | 13.10 | 0.40 | 3.05 | 5.10 | 1.25 | 3.51 |
| 0.076 | 0.027 | 10.23 | 0.26 | 2.54 | 2.31 | 1.58 | 4.04 |
| 0.073 | 0.029 | 9.83 | 0.39 | 3.97 | 2.65 | 2.12 | 4.02 |
| 0.073 | 0.029 | 13.50 | 0.44 | 3.26 | 2.23 | 1.90 | 3.38 |
| 0.036 | 0.013 | 14.20 | 0.70 | 4.93 | 0.49 | 2.15 | 3.69 |
| 0.036 | 0.013 | 11.56 | 0.80 | 6.92 | 0.50 | 2.68 | 3.75 |
| 0.036 | 0.013 | 12.36 | 0.73 | 5.91 | 0.54 | 1.81 | 4.08 |
| 0.036 | 0.013 | 10.12 | 0.94 | 9.29 | 0.52 | 1.91 | 3.93 |
| 0.036 | 0.013 | 11.02 | 0.41 | 3.72 | 0.59 | 3.28 | 4.47 |

Case Example #4

Figure 8:
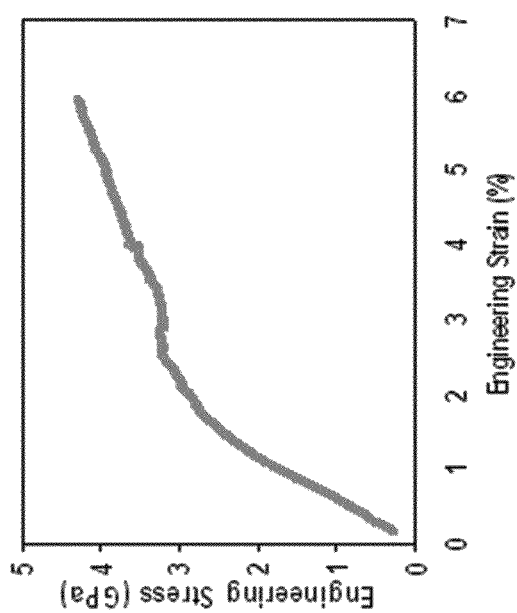
FIG. 8 The stress-strain curve of a PC7eHa microwire exhibits the strain-hardening feature.

The micro-wires may exhibit strain hardening effects like a crystalline metal. In order to investigate the underlying deformation mechanisms that may be responsible for the relatively high strength and ductility, ALLOY C microwire was selected for tensile testing, which was carried out following the same procedure as introduced earlier. The metal core diameter of the microwire was 25 μm and the gage length was 31 mm. The stress-strain curve in FIG. 8 consists of three stages: the linear elastic deformation stage, the strain-hardening stage, and the transition deformation stage. As strain hardening is generally not associated with metallic glass matrix composite, strain hardening in the microwire is believed to be unique, because strain hardening is generally believed to be impossible for metallic glass matrix composite, in which the plastic deformation is carried out by the strain-softening featured shearing within shear bands.

Figure 9:
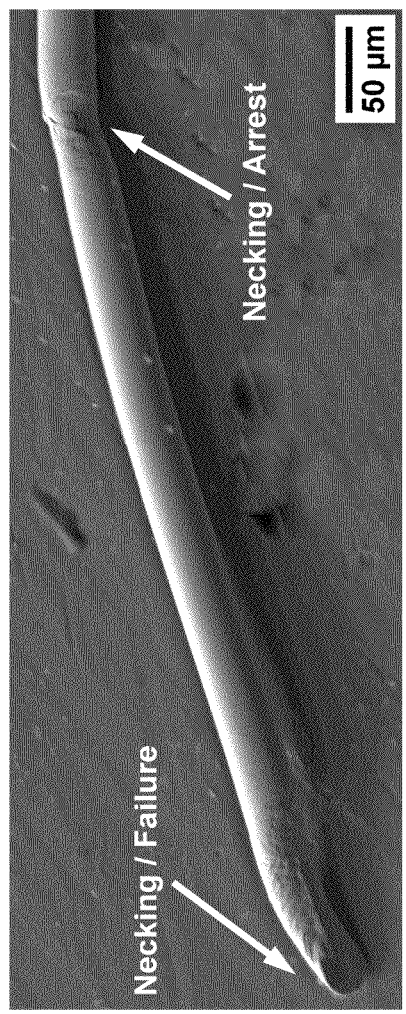
FIG. 9 Necking may occur in multiple regions in the tested microwire: the left necking led to catastrophic failure, while the right one was arrested FIG. 10a TEM micrograph of Alloy A, wherein the scale is 20 nm.

After tensile testing, the segments of the tested wire were collected and analyzed by SEM to examine the underlying physical mechanisms that results in the strain hardening effect. It was found that necking occurred in multiple locations along the gage length. Two necking regions are shown in FIG. 9. The left necking led to catastrophic failure, while the right necking was arrested rather than leading to eventual fracture. Within the necking regions, high-density slip steps occur at multiscale crossing features due to shear band blunting and additionally through arresting through shear band interactions. In between the necking regions, slip steps exhibit a modulated distribution fashion, but the overall densities are lower than those in the necking region.

Case Example #5

ALLOY A micro-wires with metal core thicknesses of 33 μm were prepared for TEM analysis by first preparing a single layer of a uniformly aligned microwire array, which was then fixed onto a TEM grid with a 2 mm wide slot using relatively tiny drops of super glue. After curing, the micro-wires were ion milled in a Gatan Precision Ion Polishing System (PIPS), which was operated at an ion beam energy level of ~4 keV. The ion beam incident angle was 10° first, then reduced to 7° after penetration, and finished up by further reducing the angle to 4° to assure appropriate thin area for TEM examination.

Figure 10B:
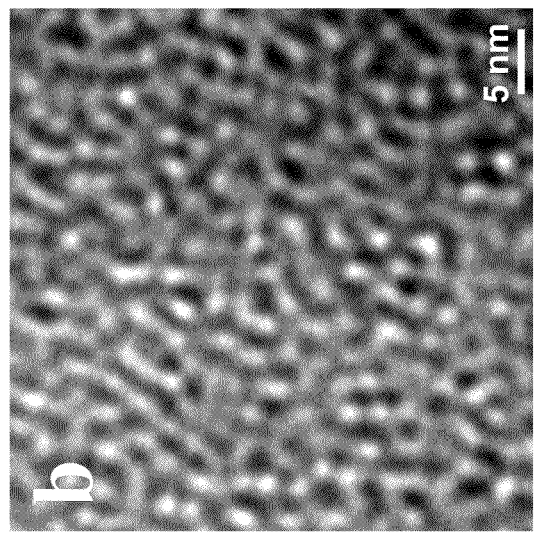
FIG. 10b TEM micrograph of Alloy A, wherein the scale is 5 nm.
Figure 10A:
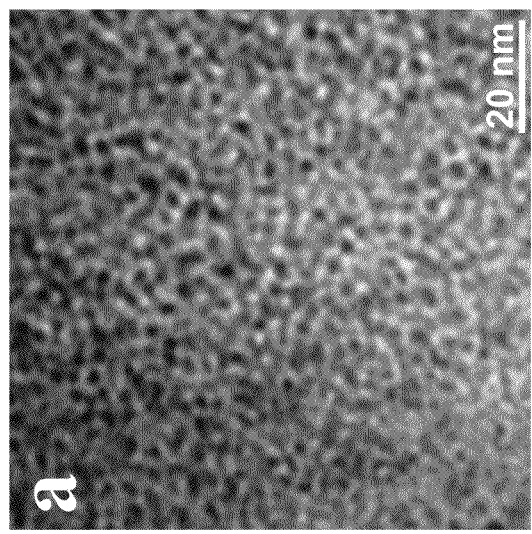
FIG. 10c SAED diffraction pattern obtained from region A, the microwire center.
Figure 10C:
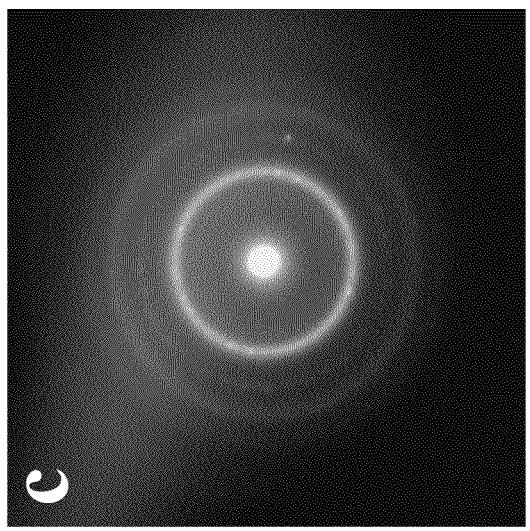

Since ion-milling may be a relatively slow polishing process in which material may be gradually removed from the currently outmost surface, TEM micrographs obtained from a sharp nanoscale tip illustrate the microstructures at the microwire center. In FIG. 10a, the structure observed near the tip represents the center of the 33 μm-thick ALLOY A microwire. The structure consists of a metallic glass matrix containing a periodic arrangement of very small clusters which are about 2-3 nm thick and 2-10 nm long (FIG. 10b). It is believed that the periodic arrangement of clusters, their shape, and their size are indicative that they were formed from a supersaturated glass matrix as a result of a spinodal decomposition. The center of microwire is found to exhibit a nanoscale spinodal glass matrix microconstituent structure (SGMM), which has been frequently observed in melt-spun ribbons of the same alloy. The corresponding SAED pattern, shown in FIG. 10c, consists of multiple diffraction rings, including both the first bright amorphous halo of the glass matrix and the crystalline diffraction rings of the clusters. The high diffraction intensity of the amorphous halo indicates that the amorphous phase may have a relatively large volume fraction forming the matrix phase. The relatively weak diffraction intensities of the crystalline diffraction rings suggest that the nanocrystals may be dispersed inside the amorphous matrix. The clusters have been tentatively identified as having a BCC structure with a lattice parameter of 2.83 Å.

Case Example #6

As an example of the variability in chemistry, which may be utilized to obtain a ductile response at relatively high tensile strength in microwire, a number of alloys shown in Table 10 were considered and processed by melt-spinning. In addition to the circular cross-sectional wires produced using the Taylor-Ulitovsky process described in previous examples, the alloys in Table 1 were also made into flat (high aspect ratio) wire using melt-spinning at a wheel tangential velocity of 10.5 m/s. In Table 10, a list of additional alloy chemistries is shown which were melt-spun with identical parameters to the alloys in Table 1.

TABLE 10

Atomic Ratio's for Alloys

| Alloy | Fe | B | C | Si | Ni | Co |
|---|---|---|---|---|---|---|
| ALLOY E | 63.00 | 12.49 | 4.54 | 0.47 | 16.50 | 3.00 |
| ALLOY F | 67.54 | 12.49 | 0.00 | 0.47 | 16.50 | 3.00 |
| ALLOY G | 66.04 | 12.49 | 1.50 | 0.47 | 16.50 | 3.00 |
| ALLOY H | 64.54 | 12.49 | 3.00 | 0.47 | 16.50 | 3.00 |
| ALLOY I | 63.00 | 12.49 | 4.54 | 0.47 | 16.50 | 3.00 |
| ALLOY J | 65.54 | 14.49 | 0.00 | 0.47 | 16.50 | 3.00 |
| ALLOY K | 64.04 | 14.49 | 1.50 | 0.47 | 16.50 | 3.00 |
| ALLOY L | 62.54 | 14.49 | 3.00 | 0.47 | 16.50 | 3.00 |
| ALLOY M | 61.00 | 14.49 | 4.54 | 0.47 | 16.50 | 3.00 |
| ALLOY N | 63.54 | 16.49 | 0.00 | 0.47 | 16.50 | 3.00 |
| ALLOY O | 62.04 | 16.49 | 1.50 | 0.47 | 16.50 | 3.00 |
| ALLOY P | 60.54 | 16.49 | 3.00 | 0.47 | 16.50 | 3.00 |
| ALLOY Q | 61.54 | 18.49 | 0.00 | 0.47 | 16.50 | 3.00 |
| ALLOY R | 60.04 | 18.49 | 1.50 | 0.47 | 16.50 | 3.00 |
| ALLOY S | 58.54 | 18.49 | 3.00 | 0.47 | 16.50 | 3.00 |
| ALLOY T | 63.30 | 12.55 | 4.56 | 0.00 | 16.58 | 3.01 |
| ALLOY U | 63.00 | 12.49 | 4.54 | 0.47 | 16.50 | 3.00 |
| ALLOY V | 62.69 | 12.43 | 4.52 | 0.97 | 16.42 | 2.99 |
| ALLOY W | 62.37 | 12.37 | 4.49 | 1.47 | 16.34 | 2.97 |
| ALLOY X | 62.06 | 12.30 | 4.47 | 1.96 | 16.25 | 2.96 |
| ALLOY Y | 61.74 | 12.24 | 4.45 | 2.46 | 16.17 | 2.94 |
| ALLOY Z | 61.43 | 12.18 | 4.43 | 2.96 | 16.09 | 2.93 |
| ALLOY A1 | 61.11 | 12.12 | 4.40 | 3.46 | 16.01 | 2.91 |
| ALLOY A2 | 60.18 | 12.24 | 4.45 | 2.46 | 16.17 | 4.50 |
| ALLOY A3 | 58.68 | 12.24 | 4.45 | 2.46 | 16.17 | 6.00 |
| ALLOY A4 | 57.18 | 12.24 | 4.45 | 2.46 | 16.17 | 7.50 |
| ALLOY A5 | 60.05 | 16.49 | 0.00 | 2.46 | 16.50 | 4.50 |
| ALLOY A6 | 58.55 | 16.49 | 0.00 | 2.46 | 16.50 | 6.00 |

TABLE 10-continued

Atomic Ratio's for Alloys

| Alloy | Fe | B | C | Si | Ni | Co |
|---|---|---|---|---|---|---|
| ALLOY A7 | 57.05 | 16.49 | 0.00 | 2.46 | 16.50 | 7.50 |
| ALLOY A8 | 55.55 | 16.49 | 0.00 | 2.46 | 16.50 | 9.00 |
| ALLOY A9 | 54.05 | 16.49 | 0.00 | 2.46 | 16.50 | 10.50 |
| ALLOY A10 | 52.55 | 16.49 | 0.00 | 2.46 | 16.50 | 12.00 |
| ALLOY A11 | 51.05 | 16.49 | 0.00 | 2.46 | 16.50 | 13.50 |
| ALLOY A12 | 49.55 | 16.49 | 0.00 | 2.46 | 16.50 | 15.00 |
| ALLOY A13 | 48.05 | 16.49 | 0.00 | 2.46 | 16.50 | 16.50 |
| ALLOY A14 | 46.55 | 16.49 | 0.00 | 2.46 | 16.50 | 18.00 |
| ALLOY A15 | 45.05 | 16.49 | 0.00 | 2.46 | 16.50 | 19.50 |
| ALLOY A16 | 43.55 | 16.49 | 0.00 | 2.46 | 16.50 | 21.00 |

The mechanical properties of the high aspect ratio wires were determined at room temperature using microscale tensile testing using a very similar methodology as described previously and are summarized in Table 11. As can be seen, depending on the alloy and individual measurement, the total elongation is found to vary from 1.7 to 6.8% and the ultimate tensile strength is found to vary from 1.3 to 3.5 GPa. For Alloys A, B, C, and D, the tensile data can be compared between that produced by the Taylor-Ulitovsky process, producing circular cross section wire (Tables 6 through 9) and that produced by the melt-spinning high aspect ratio wires in Table 11. Tensile properties of the circular wire are relatively similar and generally higher than the same chemistries processed into high aspect ratio wire. Depending on the chemistry and individual measurement, the total elongation is from 1 to 4% higher and the tensile strength is 0.5 to 2.5 GPa higher in the circular cross sectional wire. It was found that the relatively thin Taylor-Ulitovsky wires cool relatively faster for the same thickness compared to melt-spinning since there is only one chill surface while in Taylor-Ulitovsky wire production, the outside of the wire is cooled on all sides through water cooling. The relatively faster cooling rates generally leads to relatively higher degrees of uniformity in structure and earlier stage spinodal decomposition leading to finer cluster sizes.

Based on the direct process and property comparisons of Alloys A, B, C, and D, it is expected that the additional chemistries listed in Table 10, would work well in the Taylor-Ulitovsky process. Additionally, it is contemplated that as good or better tensile properties may be obtained for each alloy when processed using the Taylor-Ulitovsky process compared to melt-spinning. Thus, it is contemplated that the alloys listed in Table 10 are expected to work well and give exemplary results in the Taylor-Ulitovsky process.

TABLE 11

Summary of Tensile Test Results at 10.5 m/s

| Alloy | Total Elongation (%) | Ultimate Tensile Strength (GPa) |
|---|---|---|
| ALLOY A | 3.24 | 2.15 |
| | 4.29 | 2.86 |
| | 3.83 | 2.74 |
| ALLOY B | 5.46 | 3.72 |
| | 4.02 | 3.63 |
| | 4.08 | 3.71 |
| ALLOY C | 1.95 | 1.56 |
| | 2.41 | 1.93 |
| | 2.19 | 1.49 |
| ALLOY D | 3.88 | 3.51 |
| | 4.62 | 3.73 |
| | 3.73 | 3.87 |

TABLE 11-continued

Summary of Tensile Test Results at 10.5 m/s

| Alloy | Total Elongation (%) | Ultimate Tensile Strength (GPa) |
|---|---|---|
| ALLOY E | 4.16 | 2.68 |
|  | 2.43 | 1.48 |
|  | 3.61 | 2.38 |
| ALLOY F | 2.85 | 1.45 |
|  | 3.26 | 1.68 |
|  | 2.87 | 1.42 |
| ALLOY G | 2.56 | 1.41 |
|  | 2.07 | 1.49 |
|  | 2.43 | 1.48 |
| ALLOY H | 2.98 | 1.98 |
|  | 2.77 | 1.75 |
|  | 2.83 | 1.15 |
| ALLOY I | 2.00 | 1.23 |
|  | 3.81 | 1.38 |
|  | 2.58 | 1.19 |
| ALLOY J | 3.04 | 2.01 |
|  | 3.94 | 2.38 |
|  | 3.21 | 1.94 |
| ALLOY K | 2.33 | 1.57 |
|  | 2.33 | 1.50 |
|  | 4.27 | 2.76 |
| ALLOY L | 4.99 | 2.79 |
|  | 4.53 | 2.49 |
|  | 4.42 | 2.74 |
| ALLOY M | 3.75 | 2.09 |
|  | 6.09 | 3.15 |
|  | 2.40 | 1.93 |
| ALLOY N | 2.80 | 1.92 |
|  | 3.08 | 1.76 |
|  | 3.73 | 2.45 |
| ALLOY O | 4.02 | 2.67 |
|  | 3.93 | 2.54 |
|  | 4.02 | 2.51 |
| ALLOY P | 1.72 | 1.08 |
|  | 2.65 | 1.41 |
|  | 2.10 | 1.34 |
| ALLOY Q | 4.39 | 2.59 |
|  | 3.95 | 2.42 |
|  | 4.69 | 2.42 |
| ALLOY R | 4.94 | 2.40 |
|  | 3.38 | 1.91 |
|  | 5.66 | 2.31 |
| ALLOY S | 2.16 | 1.26 |
|  | 2.60 | 1.39 |
|  | 2.08 | 1.36 |
| ALLOY T | 5.70 | 2.47 |
|  | 3.93 | 2.11 |
|  | 5.67 | 2.15 |
| ALLOY U | 4.77 | 2.35 |
|  | 5.66 | 2.83 |
|  | 4.57 | 2.52 |
| ALLOY V | 3.05 | 1.80 |
|  | 4.41 | 2.21 |
|  | 3.06 | 1.81 |
| ALLOY W | 2.61 | 1.37 |
|  | 2.56 | 1.51 |
|  | 2.59 | 1.37 |
| ALLOY X | 5.29 | 2.58 |
|  | 5.24 | 2.47 |
|  | 5.94 | 2.63 |
| ALLOY Y | 5.96 | 2.93 |
|  | 4.65 | 2.52 |
|  | 4.31 | 3.32 |
| ALLOY Z | 2.58 | 2.09 |
|  | 5.04 | 2.98 |
|  | 4.45 | 2.75 |
| ALLOY A1 | 6.80 | 2.69 |
|  | 5.17 | 2.12 |
|  | 4.92 | 3.45 |
| ALLOY A2 | 4.87 | 3.05 |
|  | 4.33 | 2.95 |
|  | 4.26 | 2.92 |
| ALLOY A3 | 4.45 | 2.79 |
|  | 4.77 | 2.83 |
|  | 4.21 | 3.03 |
| ALLOY A4 | 4.07 | 2.98 |
|  | 3.71 | 2.76 |
|  | 4.33 | 2.89 |
| ALLOY A5 | 4.67 | 2.72 |
|  | 4.77 | 3.21 |
|  | 2.72 | 2.27 |
| ALLOY A6 | 4.51 | 3.21 |
|  | 4.27 | 3.15 |
|  | 3.84 | 3.30 |
| ALLOY A7 | 5.58 | 2.64 |
|  | 4.77 | 2.36 |
|  | 4.45 | 2.35 |
| ALLOY A8 | 4.59 | 2.93 |
|  | 4.62 | 2.91 |
|  | 4.25 | 3.34 |
| ALLOY A9 | 4.64 | 3.19 |
|  | 5.66 | 3.70 |
|  | 4.31 | 2.76 |
| ALLOY A10 | 4.07 | 3.17 |
|  | 5.11 | 2.97 |
|  | 3.82 | 2.90 |
| ALLOY A11 | 4.46 | 3.09 |
|  | 5.17 | 2.80 |
|  | 3.87 | 3.16 |
| ALLOY A12 | 4.65 | 3.07 |
|  | 3.87 | 3.12 |
|  | 4.30 | 3.13 |
| ALLOY A13 | 5.36 | 2.93 |
|  | 4.28 | 2.75 |
|  | 3.87 | 3.17 |
| ALLOY A14 | 3.89 | 2.52 |
|  | 3.91 | 2.67 |
|  | 3.66 | 3.07 |
| ALLOY A15 | 4.05 | 2.38 |
|  | 3.97 | 2.66 |
|  | 2.98 | 2.39 |
| ALLOY A16 | 4.35 | 2.85 |
|  | 4.33 | 2.58 |
|  | 4.60 | 2.67 |

Accordingly, contemplated herein are modifications to the Taylor-Ulitovsky wire making process which may result in the use of a pressure control system allowing a negative pressure gradient to be applied using air or inert gas delivery. The system may use an iron based alloy including at least 35 at % Fe, nickel and/or cobalt in the range of about 7 to 50 at %, at least one non/metal or metalloid selected from the group consisting of B, C, Si, P, and/or N present in the range of about 1 to 35 at %, and one metal selected from the group consisting of W, Cr, Ti, Mo, Y, and/or Al present in the range of about 0 to 25 at %. The microwire produced may exhibit an ultimate tensile strength of 2 to 6 GPa and a tensile elongation of 1 to 15%. In addition, the resulting microwire may include a metallic glass matrix containing 2 to 90% (by volume) of nanocrystalline phases in the size range from 1 to 20 nm.

In addition, long lengths of microwire over 1 km may be produced using cored wire feedstock with diameters of 0.045" to (1.2 mm) to 3/16" (4.7 mm). Furthermore, cooling rates may be increased using water brines as cooling water, including water containing 1 to 25% total brine concentration from individual salts or mixtures from the following list (NaCl, LiCl, $MgCl_2$, $CaCl_2$ or NaOH).

The foregoing description of several methods and embodiments has been presented for purposes of illustration. It is not intended to be exhaustive or to limit the precise steps and/or forms disclosed, and many modifications and variations are possible in light of the above teaching.

What is claimed is:

1. A method of forming a micro-wire, comprising:
heating metal feedstock to a liquid state within a glass tube, wherein said metal feedstock includes an iron based glass forming alloy wherein said iron based alloy consists of: iron present in the range of 43 atomic percent to 68 atomic percent, boron present in the range of 12 atomic percent to 17 atomic percent, optionally carbon present in the range of 1.5 atomic percent to 5 atomic percent, silicon present in the range of 0.4 atomic percent to 4 atomic percent, nickel present in the range of 16 atomic percent to 17 atomic percent, and cobalt optionally present in the range of 2 atomic percent to 21 atomic percent;
providing an inert negative pressure environment by a pressure control system including a vacuum pump and a gas supply to the interior of said glass tube;
drawing down said glass tube containing said metal feedstock; and
cooling said metal feedstock in said glass tube with a brine solution at a rate sufficient to form a wire exhibiting nanocrystalline microstructures present in the range of 2 to 90 percent by volume in a glass matrix and said nanocrystalline microstructure are from 1 nm to 20 nm in size.

2. The method of claim 1, wherein said metal feedstock is provided in the form of continuous wire.

3. The method of claim 1, wherein providing negative pressure includes supplying an inert gas to the interior of the glass tube.

4. The method of claim 1, wherein cooling comprises applying a brine to said drawn glass tube containing said metal feedstock.

5. The method of claim 1, wherein said cooling is performed at a cooling rate in the range of $10^4$ to $10^6$ K/s.

6. The method of claim 1, wherein said wire has a diameter in the range of 1 µm to 150 µm and said glass surrounding said wire has a thickness in the range of 2 µm to 35 µm in thickness.

7. The method of claim 1, wherein said wire exhibits a variation of 5 µm or less over a 600 km length of wire.

8. The method of claim 1, wherein said wire exhibits a percent elongation in the range of 1.7% to 12.8%.

9. The method of claim 1, wherein said wire exhibits an ultimate tensile strength in the range of 1.3 GPa to 5.8 GPa.

10. A method of forming a micro-wire, comprising:
heating metal feedstock to a liquid state within a glass tube, wherein said metal feedstock includes an iron based glass forming alloy wherein said iron based alloy consists of: iron present in the range of 49 atomic percent through 66 atomic percent, boron present in the range of 12 atomic percent to 17 atomic percent, optionally carbon present in the range of 4 atomic percent to 5 atomic percent, silicon present in the range of 0.4 atomic percent to 4 atomic percent, nickel present in the range of 16 atomic percent to 17 atomic percent, cobalt present in the range of 3 atomic percent to 12 atomic percent, and chromium optionally present in the range of 2.9 atomic percent to 3.1 atomic percent;
providing an inert negative pressure environment by a pressure control system including a vacuum pump and a gas supply to the interior of said glass tube;
drawing down said glass tube containing said metal feedstock; and
cooling said metal feedstock in said glass tube with a brine solution at a rate sufficient to form a wire exhibiting nanocrystalline microstructures present in the range of 2 to 90 percent by volume in a glass matrix and said nanocrystalline microstructure are from 1 nm to 20 nm in size.

11. The method of claim 10, wherein said metal feedstock is provided in the form of continuous wire.

12. The method of claim 10, wherein providing negative pressure includes supplying an inert gas to the interior of the glass tube.

13. The method of claim 10, wherein cooling comprises applying a brine to said drawn glass tube containing said metal feedstock.

14. The method of claim 10, wherein said cooling is performed at a cooling rate in the range of $10^4$ to $10^6$ K/s.

15. The method of claim 10, wherein said wire has a diameter in the range of 1 µm to 150 µm and said glass surrounding said wire has a thickness in the range of 2 µm to 35 µm in thickness.

16. The method of claim 10, wherein said wire exhibits a variation of 5 µm or less over a 600 km length of wire.

17. The method of claim 10, wherein said wire exhibits a percent elongation in the range of 1.7% to 12.8%.

18. The method of claim 10, wherein said wire exhibits an ultimate tensile strength in the range of 1.3 GPa to 5.8 GPa.

19. A method of forming a micro-wire, comprising:
heating metal feedstock to a liquid state within a glass tube, wherein said metal feedstock includes an iron based glass forming alloy wherein said iron based alloy consists of: iron present in the range of 43 atomic percent to 68 atomic percent, boron present in the range of 12 atomic percent to 19 atomic percent, optionally carbon present in the range of 1 atomic percent to 5 atomic percent, optionally silicon present in the range of 0.4 atomic percent to 4.0 atomic percent, nickel present in the range of 16 atomic percent to 17 atomic percent, and cobalt present in the range of 2 atomic percent to 21 atomic percent;
providing an inert negative pressure environment by a pressure control system including a vacuum pump and a gas supply to the interior of said glass tube;
drawing down said glass tube containing said metal feedstock; and
cooling said metal feedstock in said glass tube with a brine solution at a rate sufficient to form a wire exhibiting nanocrystalline microstructures present in the range of 2 to 90 percent by volume in a glass matrix and said nanocrystalline microstructure are from 1 nm to 20 nm in size.

20. The method of claim 19, wherein said metal feedstock is provided in the form of continuous wire.

21. The method of claim 19, wherein providing negative pressure includes supplying an inert gas to the interior of the glass tube.

22. The method of claim 19, wherein cooling comprises applying a brine to said drawn glass tube containing said metal feedstock.

23. The method of claim 19, wherein said cooling is performed at a cooling rate in the range of $10^4$ to $10^6$ K/s.

24. The method of claim 19, wherein said wire has a diameter in the range of 1 µm to 150 µm and said glass surrounding said wire has a thickness in the range of 2 µm to 35 µm in thickness.

25. The method of claim 19, wherein said wire exhibits a variation of 5 µm or less over a 600 km length of wire.

26. The method of claim 19, wherein said wire exhibits a percent elongation in the range of 1.7% to 12.8%.

27. The method of claim 19, wherein said wire exhibits an ultimate tensile strength in the range of 1.3 GPa to 5.8 GPa.

* * * * *